(12) United States Patent
Taylor

(10) Patent No.: US 10,081,957 B2
(45) Date of Patent: *Sep. 25, 2018

(54) COMPOSITION AND METHOD FOR WATER CONDITIONING

(71) Applicant: Silk Water Solutions Inc., Langley (CA)

(72) Inventor: Colin Frank Taylor, Chilliwack (CA)

(73) Assignee: Silk Water Solutions Inc., Langley (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,607

(22) Filed: Jul. 30, 2015

(65) Prior Publication Data
US 2016/0083276 A1    Mar. 24, 2016

Related U.S. Application Data

(63) Continuation of application No. 14/490,360, filed on Sep. 18, 2014, now Pat. No. 9,115,014.

(51) Int. Cl.
| | |
|---|---|
| *E04H 4/12* | (2006.01) |
| *C02F 1/54* | (2006.01) |
| *C11D 3/48* | (2006.01) |
| *C11D 3/36* | (2006.01) |
| *C11D 3/34* | (2006.01) |
| *C02F 1/58* | (2006.01) |
| *C02F 1/68* | (2006.01) |
| *C02F 5/10* | (2006.01) |
| *C02F 1/50* | (2006.01) |
| *C02F 101/10* | (2006.01) |
| *C02F 103/42* | (2006.01) |
| *C02F 1/66* | (2006.01) |
| *C02F 101/20* | (2006.01) |

(52) U.S. Cl.
CPC ............. *E04H 4/1209* (2013.01); *C02F 1/50* (2013.01); *C02F 1/54* (2013.01); *C02F 1/58* (2013.01); *C02F 1/683* (2013.01); *C02F 5/10* (2013.01); *C02F 5/105* (2013.01); *C11D 3/34* (2013.01); *C11D 3/36* (2013.01); *C11D 3/48* (2013.01); *E04H 4/1281* (2013.01); *C02F 1/66* (2013.01); *C02F 2101/10* (2013.01); *C02F 2101/203* (2013.01); *C02F 2103/42* (2013.01); *C02F 2303/22* (2013.01)

(58) Field of Classification Search
CPC .... C11D 3/00; C11D 3/16; C11D 3/34; C11D 3/36; C11D 3/48; C11D 3/10; A01N 59/00
USPC ............... 510/108, 109, 382, 383, 405, 446; 210/748.11

See application file for complete search history.

(56) References Cited

U.S. PATENT DOCUMENTS

| | | | | |
|---|---|---|---|---|
| 3,634,268 | A * | 1/1972 | Karg .................... | C11D 3/3418 510/427 |
| 2005/0187132 | A1* | 8/2005 | Blank .................. | C11D 3/10 510/446 |
| 2008/0035580 | A1* | 2/2008 | de Rijk ................. | A01N 59/00 210/748.11 |
| 2010/0048445 | A1 | 2/2010 | Gerusz et al. | |

FOREIGN PATENT DOCUMENTS

| | | | | |
|---|---|---|---|---|
| CA | 2 864 785 | | 9/2015 | |
| CN | 103320239 A | * | 9/2013 | |
| WO | WO 2007141635 A2 | * | 12/2007 | ........... C11D 3/2086 |

OTHER PUBLICATIONS

CN 103320239 machine translation 2015.*
International Search Report and Written Opinion of the International Searching Authority completed Apr. 10, 2018, in International Patent Application No. PCT/IB17/58497, 7 pages.

* cited by examiner

*Primary Examiner* — Khanh T Nguyen
(74) *Attorney, Agent, or Firm* — Lowe Graham Jones PLLC

(57) ABSTRACT

A water conditioning composition includes water; at least one gluconate compound; at least one carbonate compound; a non-ionic preservative; and a phosphate buffer. For example, the composition can include 87-95 wt. % water; 0.5 to 1.5 wt. % gluconate compound; 3 to 8 wt. % carbonate compound; 0.5 to 1.5 wt. % non-ionic preservative; and 0.5 to 2.5 wt. % phosphate buffer.

17 Claims, No Drawings

COMPOSITION AND METHOD FOR WATER CONDITIONING

PRIORITY CLAIM

This application is a continuation of U.S. application Ser. No. 14/490,360, filed on Sep. 18, 2014, now U.S. Pat. No. 9,115,014, the contents of which are incorporated by reference.

FIELD OF THE INVENTION

The present invention is directed to the area of water conditioning. The present invention is also directed to compositions, solutions, and methods for water conditioning.

BACKGROUND OF THE INVENTION

Pools, spas, and hot tubs require regular chemical maintenance of water for hygiene and to prevent, inhibit, or reduce the buildup of stains, mineral deposits, biofilms (including bacterial growths), and the like. These chemical treatments, however, can dry or irritate the skin of users, produce chemical odors, and produce other deposits on the filters and walls of the pool, spa, or hot tub.

It is desirable to provide water conditioning treatments that reduce or prevent dry, itching, or irritated skin, reduce or prevent chemical odors, or reduce or prevent deposits on the filters or other portions of the pool, spa, or hot tub. Preferably, a water conditioning treatment performs two or more of these functions. In addition, it is desirable that the water conditioning treatment be performed on a weekly, or less frequent basis, and that the water be suitable for use soon after treatment.

SUMMARY OF THE INVENTION

One embodiment is a water conditioning composition, consisting essentially of water; at least one gluconate compound; at least one carbonate compound; a non-ionic preservative; and a phosphate buffer.

Another embodiment is a composition, comprising 87-95 wt. % water; 0.5 to 1.5 wt. % gluconate compound; 3 to 8 wt. % carbonate compound; 0.5 to 1.5 wt. % non-ionic preservative; and 0.5 to 2.5 wt. % phosphate buffer. In at least some embodiments, the composition consists essentially of these recited components.

Yet another embodiment is a water conditioning composition, comprising 1 part gluconate compound; 4 to 10 parts carbonate compound; 0.5 to 2 parts non-ionic preservative; and 0.5 to 3 parts phosphate buffer. In at least some embodiments, the composition consists essentially of these recited components.

In any of the preceding compositions, the gluconate compound can be sodium gluconate. In any of the preceding compositions, the carbonate compound can be sodium carbonate. In any of the preceding compositions, the non-ionic preservative can be methylisothiazolinone. In any of the preceding compositions, the phosphate buffer is a combination of disodium phosphate anhydrate and monopotassium phosphate.

DETAILED DESCRIPTION OF THE PREFERRED EMBODIMENT

The present invention is directed to the area of water conditioning. The present invention is also directed to compositions, solutions, and methods for water conditioning.

In at least some embodiments, a composition for water conditioning includes at least one gluconate compound, at least one carbonate compound, a non-ionic preservative, and at least one phosphate buffer. In at least some embodiments, the composition for water conditioning consists essentially of at least one gluconate compound, at least one carbonate compound, a non-ionic preservative, and a phosphate buffer. It will be understood, however, that other non-essential components, such as dyes, scents, or the like, which do not contribute to the conditioning of water can also be included in the composition. In at least some embodiments, the composition for water conditioning consists essentially of a gluconate compound, a carbonate compound, a non-ionic preservative, and a phosphate buffer.

In at least some embodiments, the composition in the form of an aqueous solution. Preferably, all of the components of the composition are completely dissolved in the aqueous solution.

Any suitable gluconate compound can be used. Examples of suitable gluconate compounds include sodium gluconate, potassium gluconate, gluconic acid, or any combination thereof. Although these gluconate compounds are usually derived from D-gluconic acid, it will be understood that compounds derived from L-gluconic acid can also be used. In at least some embodiments, the gluconate compound is an alkali metal gluconate and is preferably sodium gluconate.

The gluconate compound can act as a chelating or sequestering agent to coordinate or bind with metal ions. In at least some embodiments, the gluconate compound chelates or sequesters metal ions, such as iron or copper ions, within the water of the pool, spa, or hot tub. In at least some embodiments, the gluconate compound, together with other components of the composition, may produce a "softness" of the water arising, at least in part, due to the chelating or sequestering of metal ions, such as iron or copper ions.

Any suitable carbonate can be used. Examples of suitable carbonate compounds include sodium carbonate, sodium bicarbonate, potassium carbonate, or any combination thereof. In at least some embodiments, the carbonate compound is an alkali metal carbonate and is preferably sodium carbonate. In at least some embodiments, the composition does not include calcium carbonate.

The carbonate compound can act as a water softening agent to coordinate or bind with metal ions such as calcium, magnesium, and the like. In at least some embodiments, the carbonate compound can also act as a buffering agent. The carbonate compound may also reduce or inhibit the corrosive effects of chlorine or bromine added to the water of the pool, spa, or hot tub.

The non-ionic preservative can be any suitable preservative compound that does not form cations or anions when in aqueous solution. Examples of the non-ionic preservative include, but are not limited to, methylisothiazolinone (available commercially as NEOLONE™ 950 from the Dow Chemical Company), methylchloroisothiazolinone, or the like. The non-ionic preservative can have bactericidal properties and is preferably biodegradable and preferably does not release formaldehyde. Preferably, the non-ionic preservative is completely soluble in water at the concentration provided in the aqueous form of the composition.

Any suitable phosphate buffer can be used. For example, the phosphate buffer can be formed using disodium phosphate anhydrate and monopotassium phosphate. Other phosphate materials can be used, such as, for example, trisodium phosphate. In some embodiments, the ratio, by weight, of disodium phosphate anhydrate to monosodium phosphate is in the range of 0.5 to 2 or in the range 0.8 to 1.3 or in the range of 0.9 to 1.1 or equal to 1. In at least some embodiments, the phosphate buffer provides buffering in a pH range of at least 7-8. In at least some embodiments, the phosphate buffer and the carbonate compound provide buffering in a pH range from 7-9 or 7-10.

In at least some embodiments, the composition does not include a metasilicate compound. In at least some embodiments, the composition does not include a sulphate compound. In at least some embodiments, the composition does not include a silver compound. In at least some embodiments, the composition does not include a preservative that can produce anions, cations, or any combination thereof in an aqueous solution. In at least some embodiments, the composition does not include calcium.

In at least some embodiments, the composition includes 87-95 wt. % water; 0.5 to 1.5 wt. % gluconate compound; 3 to 8 wt. % carbonate compound; 0.5 to 1.5 wt. % non-ionic preservative; and 0.5 to 2.5 wt. % phosphate buffer. In other embodiments, the amount of water is varied outside this range, but the proportions of the gluconate compound, carbonate compound, non-ionic preservative, and phosphate buffer relative to each other remain the same. In at least some embodiments, the composition includes 89-93 wt. % water; 0.5 to 1.2 wt. % gluconate compound; 4 to 6 wt. % carbonate compound; 0.7 to 1.2 wt. % non-ionic preservative; and 1 to 2 wt. % phosphate buffer.

In at least some embodiments, the composition includes a ratio, by weight, of 1 part gluconate compound to 4 to 10 parts (or 5 to 7 parts) carbonate compound. In at least some embodiments, the composition includes a ratio, by weight, of 1 part gluconate compound to 0.5 to 2 parts (or 0.8 to 1.4 parts) non-ionic preservative. In at least some embodiments, the composition includes a ratio, by weight, of 1 part gluconate compound to 0.5 to 3 parts (or 1.3 to 2.5 parts) phosphate buffer.

In at least some embodiments, the composition includes, by weight, 1 part gluconate compound; 4 to 10 parts carbonate compound; 0.5 to 2 parts non-ionic preservative; and 0.5 to 3 parts phosphate buffer. This composition may be aqueous. In other embodiments, the composition may be in dry form for dissolving in water.

The composition can include other non-essential components that do not contribute to the water conditioning. Such components can include dyes or scents. As an example, in some embodiments, FD&C Blue #1 is added to color the resulting aqueous solution.

Preferably, when the composition is in aqueous form, all of the components of the composition are sufficiently dissolved so that there are no visible particles in the solution when observed by the unaided eye. More preferably, when the composition is in aqueous form, all of the components of the composition are completely dissolved.

The composition can be formed using any suitable process. In some embodiments, the components are added to water sequentially. For example, the components can be added in the following order: gluconate compound; carbonate compound; non-ionic preservative; phosphate buffer. In at least some of these embodiments, the two compounds of the phosphate buffer are added sequentially. Preferably, after each component is added the resulting solution is mixed well. For example, the solution may be stirred for a period of 1 to 10 minutes at each step.

In at least some embodiments, three fluid ounces (95 mL) of the aqueous composition can be used to treat 130 to 299 gallons (490 to 1132 liters) of water once per week. In at least some embodiments, four fluid ounces (125 mL) of the aqueous composition can be used to treat 300 to 500 gallons (1135 to 1892 liters) of water once per week. Increased frequency of addition at the same rate can increase the sensory feel of softness and olfactory freshness of the treated water. Other treatment amounts can be used to treat water. In at least some embodiments, the amount of composition can be reduced by 1 fluid ounce (32 mL) if bather load (two adults bathing for 20 minutes per use) is less than three times per week.

In one embodiment, a method of using the composition includes placing new or cleaned filters into the pool, spa, or hot tub; filling the pool, spa, or hot tub with water; heating the water to a desired temperature; adding chlorine or bromine to the water; and balancing the Total Alkalinity. Preferably, the water the water is within normal usage limits: pH 7.2 to 7.5; Total Alkalinity 80 to 120 ppm; Total Hardness 180 to 250 ppm; and Chlorine or Bromine 2 to 5 ppm; which can be determined by using an appropriate test strip. The water conditioning composition as described herein can then be added to the water.

For many conventional water conditioners, a user should wait at least one day after adding the chlorine or bromine before adding the water condition. In at least some embodiments, the water conditioning composition described herein can be added within 10 minutes (or within 30 minutes or within 1 hour) of adding the chlorine or bromine. In at least some embodiments, the pool, spa, or hot tub can be used within 10 minutes or 30 minutes after adding the water conditioning composition.

EXAMPLES

A first composition included 91.54 wt. % water, 0.85 wt. % sodium gluconate, 5 wt. % soda ash (sodium carbonate); 1 wt. % methylisothiazolinone (NEOLONE™ 950); 0.80 wt. % disodium phosphate anhydrate; 0.80 wt. % monopotassium phosphate; and 0.005 wt. % of a 1% stock solution (10 grams in 1000 ml water) of FD&C Blue #1.

A first composition included 91.65 wt. % water, 0.85 wt. % sodium gluconate, 5 wt. % soda ash (sodium carbonate); 1 wt. % NEOLONE™ 950 (methylisothiazolinone); 0.75 wt. % disodium phosphate anhydrate; 0.75 wt. % monopotassium phosphate; and 0.005 wt. % of a 1% stock solution (10 grams in 1000 ml water) of FD&C Blue #1.

For each composition, the sodium gluconate was slowly added to the water and mixed well for about 5 minutes. The soda ash was added with the solution stirred at fast speed without air entrainment. The solution was mixed well and checked to ensure that all the components were dissolved and the solution was clear. NEOLONE™ 950 was then added slowly and the resulting solution mixed well. Disodium phosphate anhydrate was added slowly and the solution was mixed well for 5 minutes. Monopotassium phosphate was then added and the solution mixed well for 5 minutes. Finally, the FD&C Blue #1 solution was added for coloring.

The total alkalinity for the two compositions was in the range of 59% to 72% $Na_2O$ for 65 grams of the composition. The pH of the two compositions was in the range of 10.5±0.5. The Brix value was in the range of 10±1.

The above specification, examples and data provide a description of the manufacture and use of the composition of the invention. While the preferred embodiment of the invention has been illustrated and described, many changes can be made without departing from the spirit and scope of the invention. Accordingly, the scope of the invention is not limited by the disclosure of the preferred embodiment.

Instead, the invention should be determined entirely by reference to the claims that follow.

The embodiments of the invention in which an exclusive property or privilege is claimed are defined as follows:

1. A water conditioning composition for a spa or hot tub, the water conditioning composition comprising:
   87 to 95 wt. % of water;
   0.5 to 1.5 wt. % of at least one gluconate compound;
   3 to 8 wt. % of at least one carbonate compound;
   0.5 to 1.5 wt. % of a non-ionic preservative;
   0.5 to 2.5 wt. % of a phosphate buffer, wherein the phosphate buffer comprises at least two of disodium phosphate anhydrate, monopotassium phosphate, or trisodium phosphate;
   optionally, a dye; and
   optionally, a scent;
   wherein the composition does not contain calcium and wherein the water conditioning composition is configured and arranged for treating water in the spa or hot tub within which, after treatment, a user can bathe in the treated water.

2. The composition of claim 1, wherein the at least one gluconate compound is selected from sodium gluconate, potassium gluconate, or any combination thereof.

3. The composition of claim 1, wherein the at least one carbonate compound is selected from sodium carbonate, sodium bicarbonate, potassium carbonate, or any combination thereof.

4. The composition of claim 1, wherein the non-ionic preservative is selected from methylisothiazolinone, methylchloroisothiazolinone, or any combination thereof.

5. The composition of claim 1, wherein the at least one gluconate compound is sodium gluconate, the at least one carbonate compound is sodium carbonate, the non-ionic preservative is methylisothiazolinone, and the phosphate buffer is disodium phosphate anhydrate and monopotassium phosphate.

6. The composition of claim 1, wherein the phosphate buffer consists of both disodium phosphate anhydrate and monopotassium phosphate.

7. The composition of claim 6, wherein the disodium phosphate anhydrate and monopotassium phosphate are provided in respective amounts so that the phosphate buffer provides buffering in a pH range of at least 7 to 9.

8. The composition of claim 1, wherein the composition consists essentially of 89-93 wt. % water; 0.5 to 1.2 wt. % of the at least one gluconate compound; 4 to 6 wt. % of the at least one carbonate compound; 0.7 to 1.2 wt. % of the non-ionic preservative; and 1 to 2 wt. % of the phosphate buffer.

9. The composition of claim 1, wherein the composition does not include a metasilicate compound and does not include a sulfate compound.

10. The composition of claim 9, wherein the composition consists essentially of 89-93 wt. % water; 0.5 to 1.2 wt. % of the at least one gluconate compound; 4 to 6 wt. % of the at least one carbonate compound; 0.7 to 1.2 wt. % of the non-ionic preservative; and 1 to 2 wt. % of the phosphate buffer.

11. A water conditioning composition for a spa or hot tub, comprising:
    1 part gluconate compound;
    4 to 10 parts carbonate compound;
    0.5 to 2 parts non-ionic preservative; and
    0.5 to 3 parts phosphate buffer, wherein the phosphate buffer comprises at least two of disodium phosphate anhydrate, monopotassium phosphate, or trisodium phosphate;
    wherein the water conditioning composition is configured and arranged for treating water in the spa or hot tub within which, after treatment, a user can bathe in the treated water.

12. The composition of claim 11, wherein the at least one gluconate compound is selected from sodium gluconate, potassium gluconate, or any combination thereof.

13. The composition of claim 11, wherein the at least one carbonate compound is selected from sodium carbonate, sodium bicarbonate, potassium carbonate, or any combination thereof.

14. The composition of claim 11, wherein the non-ionic preservative is selected from methylisothiazolinone, methylchloroisothiazolinone, or any combination thereof.

15. The composition of claim 11, wherein the composition is an aqueous solution.

16. The composition of claim 11, wherein the composition is in a dry form.

17. The composition of claim 11, wherein the composition does not include a metasilicate compound and does not include a sulfate compound.

* * * * *